US010313488B2

(12) United States Patent
Lin

(10) Patent No.: US 10,313,488 B2
(45) Date of Patent: Jun. 4, 2019

(54) FILE MANAGEMENT METHOD AND FILE MANAGEMENT DEVICE FOR TELEVISION DEVICES

(71) Applicant: AmTRAN TECHNOLOGY CO.,LTD, New Taipei (TW)

(72) Inventor: Chia-Wei Lin, New Taipei (TW)

(73) Assignee: AMTRAN TECHNOLOGY CO., LTD, New Taipei (TW)

( * ) Notice: Subject to any disclaimer, the term of this patent is extended or adjusted under 35 U.S.C. 154(b) by 415 days.

(21) Appl. No.: 15/065,407

(22) Filed: Mar. 9, 2016

(65) Prior Publication Data
US 2017/0134533 A1    May 11, 2017

(30) Foreign Application Priority Data

Nov. 11, 2015   (TW) .............................. 104137206 A

(51) Int. Cl.
*H04L 29/08* (2006.01)
*H04L 29/06* (2006.01)

(52) U.S. Cl.
CPC .............. *H04L 69/08* (2013.01); *H04L 67/04* (2013.01); *H04L 67/1076* (2013.01); *H04L 67/1078* (2013.01); *H04L 67/141* (2013.01); *H04L 67/147* (2013.01); *H04L 67/2823* (2013.01)

(58) Field of Classification Search
CPC ............. H04L 67/1076; H04L 67/1078; H04L 67/2823; H04L 67/04
See application file for complete search history.

(56) References Cited

U.S. PATENT DOCUMENTS

| 8,489,702 | B2* | 7/2013 | Batson | G06F 17/30017 709/206 |
| 8,612,470 | B1* | 12/2013 | Fushman | G06F 17/30867 707/767 |
| 8,688,665 | B2* | 4/2014 | Tirpak | H04L 65/4084 707/705 |
| 9,525,712 | B1* | 12/2016 | Batra | H04L 65/604 |
| 2004/0213273 | A1* | 10/2004 | Ma | G06F 21/10 370/401 |
| 2006/0015580 | A1* | 1/2006 | Gabriel | H04N 7/17309 709/219 |
| 2008/0140664 | A1* | 6/2008 | Hao | G06F 17/30038 |
| 2009/0215477 | A1* | 8/2009 | Lee | H04L 51/38 455/466 |
| 2010/0223407 | A1* | 9/2010 | Dong | H04N 21/2343 710/70 |
| 2010/0241651 | A1* | 9/2010 | Xiong | G06Q 10/06 707/769 |
| 2010/0325086 | A1* | 12/2010 | Skinner | G06F 17/30905 707/609 |

(Continued)

Primary Examiner — Patrice L Winder
(74) Attorney, Agent, or Firm — Muncy, Geissler, Olds & Lowe, P.C.

(57) ABSTRACT

A file management method, a file management device and a computer-readable media for television equipment are disclosed. The file management method includes the following steps: receiving a download request from one of a plurality of mobile devices; reading management data which records a plurality of specifications respectively corresponding to the mobile devices; downloading a file in a first file format from the Internet, and the first file format conforming to the specification common to most of the mobile devices.

12 Claims, 4 Drawing Sheets

(56) References Cited

U.S. PATENT DOCUMENTS

| | | | |
|---|---|---|---|
| 2010/0333209 A1* | 12/2010 | Alve | G06F 21/10 |
| | | | 726/26 |
| 2011/0055901 A1* | 3/2011 | Karaoguz | G06F 21/10 |
| | | | 726/4 |
| 2011/0055935 A1* | 3/2011 | Karaoguz | G06F 21/10 |
| | | | 726/29 |
| 2011/0235991 A1* | 9/2011 | Luthra | H04N 21/4126 |
| | | | 386/232 |
| 2012/0079126 A1* | 3/2012 | Evans | H04L 67/1095 |
| | | | 709/230 |
| 2013/0339474 A1* | 12/2013 | Picker | H04N 21/43615 |
| | | | 709/217 |
| 2015/0312644 A1* | 10/2015 | Ansley | H04N 21/6125 |
| | | | 725/95 |

* cited by examiner

FILE MANAGEMENT METHOD AND FILE MANAGEMENT DEVICE FOR TELEVISION DEVICES

CROSS-REFERENCE TO RELATED APPLICATIONS

This non-provisional application claims priority under 35 U.S.C. § 119(a) on Patent Application No(s). 104137206 filed in Taiwan, R.O.C. on Nov. 11, 2015, the entire contents of which are hereby incorporated by reference.

BACKGROUND

Technical Field

The disclosure relates to a file management method and a file management device, more particularly to a file management method and a file management device for television devices.

Related Art

For an ordinary family, the living room furnished with a smart television is the place where all family members get along with and most often interact with each other. Due to fast development of technologies, functions of a smart television are getting more powerful. Although usual smart televisions already have network connectivity functions, those apparatuses lack friendly user interfaces for the elderly to use. Thus, a smart television is still not as convenient in many aspects as a computer host is.

In addition, in past few years, many firms have introduced interactivity functions and applications between the smart television and the mobile device. However, hardware specifications of mobile products are diversified, and resolutions, supported decoding formats, and transmission capabilities of separate mobile devices are different. Therefore, there is still great room for improving user experience with respect to interactivity functions and applications in between.

SUMMARY

The disclosure may adaptively download files in a certain format corresponding to the specification of a mobile device, so as to resolve the above problems.

The disclosure provides a file management method applied to television equipment, and the file management method includes the following steps in an embodiment. Receive a download request for a file from one of a plurality of mobile devices. Read management data recording specifications respectively corresponding to the mobile devices. Download the file in a first file format from Internet according to the management data. The first file format conforms to the specification common to the largest number of mobile devices.

In another embodiment, the file management method further includes steps of: determining whether the first file format conforms to the specification of the mobile device issuing the download request; sending the file in the first file format to the mobile device issuing the download request when the first file format conforms to the specification of the mobile device issuing the download request; and downloading the file in a second file format from the network when the first file format does not conform to the specification of the mobile device issuing the download request. The second file format conforms to the specification common to the second largest number of mobile devices.

In yet another embodiment, the file management method further includes steps of: determining whether the above second file format conforms to the specification of the mobile device issuing the download request; replacing the second file format by a new second file format to download the file in the new second file format when the second file format does not conform to the specification of the mobile device issuing the download request, and then repeating the above steps until the new second file format conforms to the specification of the mobile device issuing the download request; and sending the file in the second file format to the mobile device issuing the download request when the above second file format conforms to the specification of the mobile device issuing the download request.

In yet another embodiment, the file management method further includes steps of: determining whether the authority attributed to the mobile device issuing the download request conforms to a content of the file; and sending the file in the first or second file format to the mobile device issuing the download request when the authority attributed to the mobile device issuing the download request conforms to the content of the file.

In yet another embodiment, the above management data is established through a registration procedure related to the mobile devices, and the registration procedure includes the following steps. Receive model information of each of the mobile devices. Acquire the specification of the mobile device corresponding to the model information of each of the mobile devices. Record the specifications in the management data.

The disclosure provides a computer-readable media storing a program that is executable to perform the above file management method in an embodiment.

The disclosure also provides a file management device for television equipment, and in an embodiment, the file management device includes a communication module, a management module, a searching module and a transmission module. The management module is coupled to the communication module. The searching module is coupled to the communication module and the management module. The transmission module is coupled to the searching module. The communication module may receive a download request for a file from one of multiple mobile devices. The management module reads management data recording specifications respectively corresponding to the mobile devices. The searching module downloads the file in a first file format from the Internet according to the management data. The first file format conforms to the specification common to most of the mobile devices.

The disclosure provides another file management method applied to television equipment, and this file management method includes the following steps in one or more embodiments. Receive a download request for a file from one of multiple mobile devices. Read management data recording specifications respectively corresponding to the mobile devices. Download the file in a file format from the Internet according to the management data. The file format conforms to the specification common to most of the mobile devices.

As described above, the disclosure may download a file in a first file format from Internet according to specifications respectively corresponding to a plurality of mobile devices after receiving a download request, so the first file format conforms to the specification common to most of the mobile devices. Alternatively, the disclosure may download a file in a second file format from the Internet, so the second file format conforms to the specification common to the second largest number of mobile devices, or further conforms to the specification of the mobile device issuing the download request. Therefore, convenience of the television equipment is enhanced, and user experience, with respect to interactivity functions and applications between the television equipment and the mobile devices, is greatly improved.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
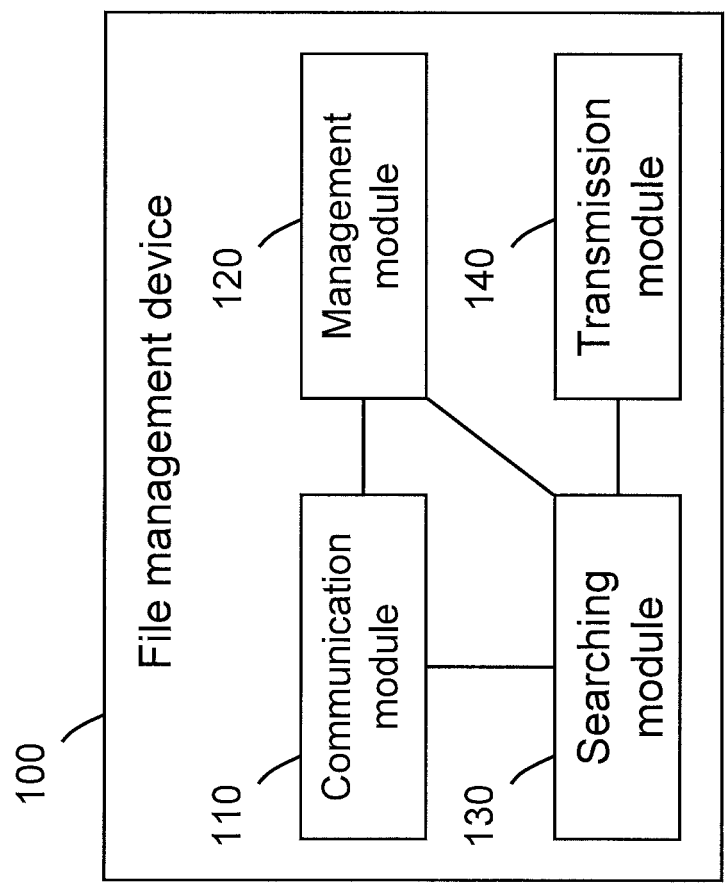
FIG. 1 is a block diagram of a file management device for television equipment in an embodiment.

FIG. 1 is a block diagram of a file management device 100 for television equipment in an embodiment. As shown in FIG. 1, the file management device 100 includes a communication module 110, a management module 120, a searching module 130 and a transmission module 140. The management module 120 is coupled to the communication module 110, the searching module 130 is coupled to the communication module 110 and the management module 120, and the transmission module 140 is coupled to the searching module 130. The communication module 110, the management module 120, the searching module 130 and the transmission module 140 may be, but herein not limited to, distinct chips or microprocessors.

The file management device 100 may be built in, but herein not limited to, a smart television or set-top box (STB) or a peripheral device associated with a television. The file management device 100 allows multiple mobile devices to register thereto, so the file management device 100 may keep relevant information about these mobile devices. For example, these mobile devices are smart phones, tablet computers, mobile computers and etc. separately belonging to members of a family. The file management device 100 keeps operating when the television equipment is in the turning-on or standby mode, or operation of the file management device 100 is independent of the state of the television equipment. The disclosure does not restrict operation of the television equipment to any of above implementations.

For example, in a utilization circumstance that one of a family members desires to search for the movie file "The Bourne Identity 4" from internet for recommending it to other members of this family, the user may link his/her mobile device to the file management device 100 through Bluetooth or Wi-Fi Direct, so as to command the file management device 100 to search for and download this movie file in the internet, because the file management device 100 may have a better network transmission quality, and the user of the mobile device may not have applied for an unlimited network plan. The above utilization circumstance will be exemplified below to elaborate details of embodiments in the disclosure.

Figure 2:
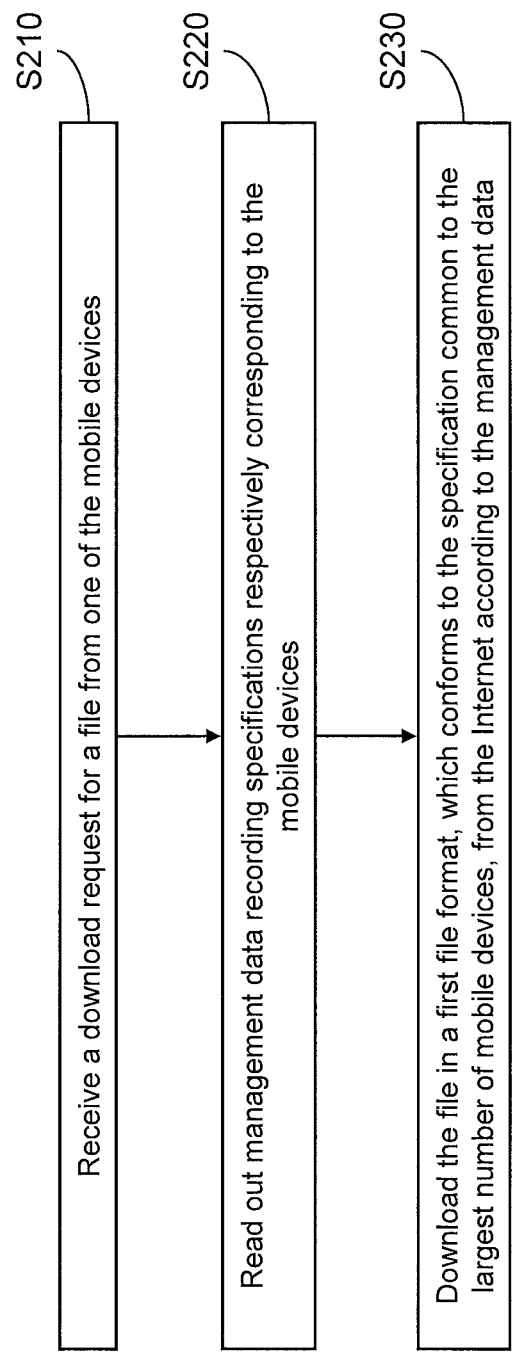
FIG. 2 is a flow chart of a file management method applied to the television equipment in an embodiment.

FIG. 2 is a flow chart of a file management method applied to the television equipment in an embodiment. As shown in FIG. 2, in this embodiment, the file management method includes steps S210~S230, which are illustrated below by referring to FIG. 1 and FIG. 2.

In step S210, the communication module 110 receives a download request for a file from one of the mobile devices. The file herein is, for example, an image file or an audio file. In this embodiment, as described above, the communication module 110 may receive the download request through Bluetooth or Wi-Fi Direct.

In step S220, the management module 120 reads the management data recording the specifications respectively corresponding to the mobile devices. For example, these specifications are related to resolutions, supported video formats, supported audio formats, frame rates, decoding capabilities (e.g. profile, level, tier) of decoders of the mobile devices and etc., or other relevant performance information. When the communication module 110 receives the above download request, the management module 120 reads the management data taken as a reference for subsequent file searching and download processes, for making most of the mobile devices in the family be able to display downloaded files.

In an embodiment, the management data is established through a registration procedure related to the mobile devices. In the registration procedure, the management module 120 receives the model information of each of the mobile devices, acquires the specification of each of the mobile devices according to the model information of each of the mobile devices, and records these specifications in the management data. For example, after the television equipment with the file management device 100 built in is taken home by the family, it requires to perform the registration procedure for the file management device 100 to record relevant information, e.g. model information, of each mobile device, so that each family member's mobile device may interact with the file management device 100 to carry out relevant application. The model information may be input in the registration procedure by each user or automatically detected by the management module 120 while the mobile device links to the file management device 100, and the disclosure is not limited to above implementations.

After the management module 120 acquires the model information of each of the mobile devices, the management module 120 may automatically search for the specification in a built-in database in accordance with the acquired model information, or else acquire the specification corresponding to the model information from a related online database by connecting to the Internet, and the disclosure is not limited to above implementations. In another embodiment, if the users know the specifications of their mobile devices, they can set the specifications in the registration procedure by themselves.

In step S230, the searching module 130 downloads the file in the first file format from the Internet according to the management data. The first file format conforms to the specification common to the largest number of mobile devices. For instance, if the file to be downloaded is a video file, the file format may be MPEG-2, MPEG-4, H.264, H.265, RM, WMV, VC-1, AVS China, AVS2, DIRAC, VP8 or VP9 compression format or other file format. If the file to be downloaded is an audio file, the file format may be MP3, WAV, WMA, AAC, AC-3, OGG or FLAC compression format or other file format. If the file to be downloaded is a movie file having video and audio contents, the file may be a movie file supporting a specific container format, e.g. AVI, ASF, MP4, MKV, 3GP, or MOV container format. The searching module 130 may also download a film having a frame rate 120 Hz.

For example, when a movie file "The Bourne Identity 4" only in the H.264 format is found on the Internet, the searching module 130 downloads this H.264 movie file from the Internet as long as the searching module 130 determines that all mobile devices of the family can support the H.264 format.

For example, when a movie files "The Bourne Identity 4" in the AVI, MP4, RM and RMVB formats are found on the Internet, the searching module 130 downloads the AVI movie file from the internet as long as the searching module 130 determines that five of the mobile devices of the family support the AVI format and the rest three support the MP4 format, confirming the AVI format can be supported by most of the mobile devices and leaving other formats unsupported.

Figure 3:
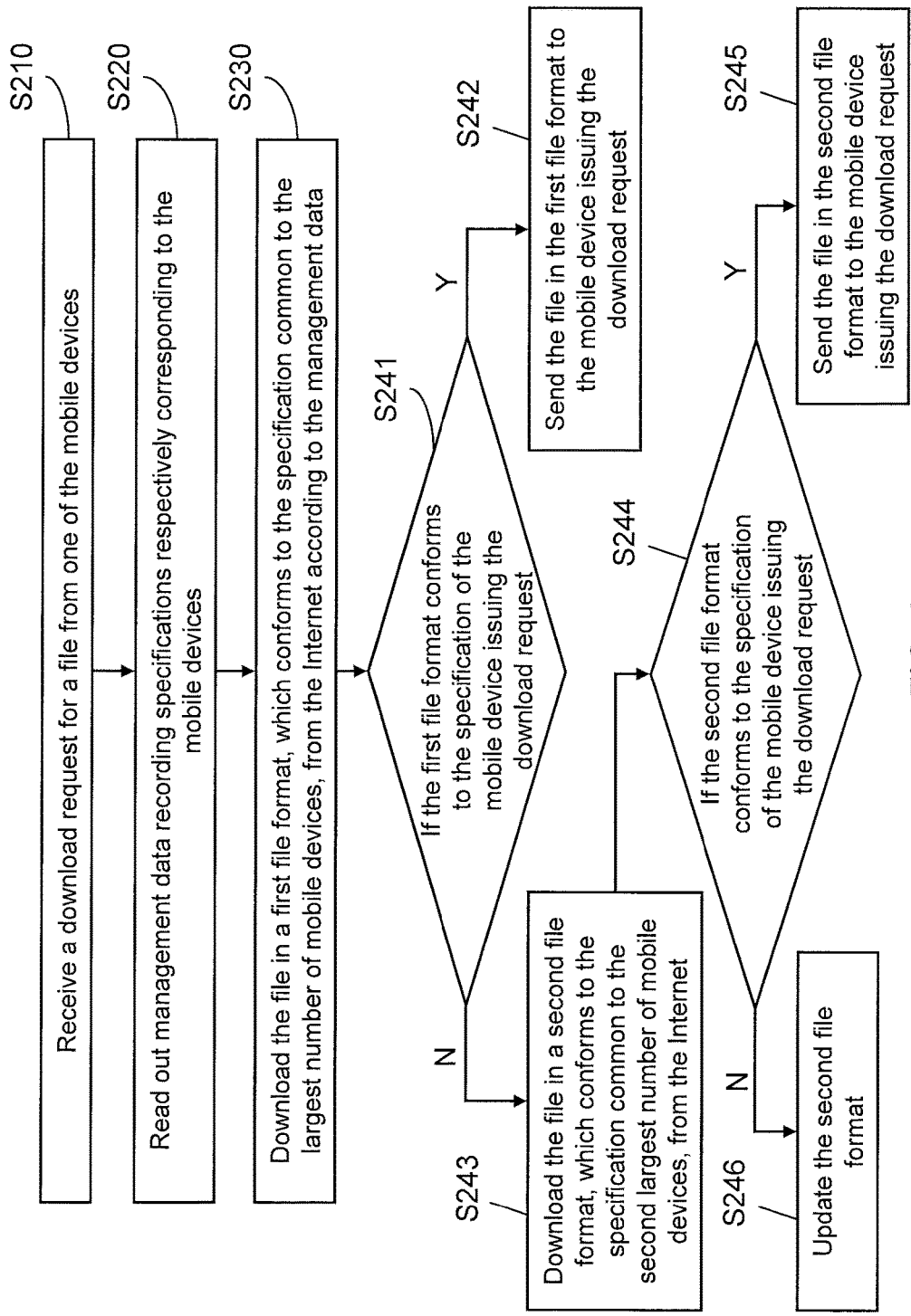
FIG. 3 is a flow chart of a file management method applied to the television equipment in another embodiment.

FIG. 3 is a flow chart of a file management method applied to the television equipment in another embodiment. As shown in FIG. 3, in this embodiment, in addition to the above steps S210~S230, the file management method also includes steps S241~S246, which are illustrated below by referring to FIG. 1 and FIG. 3.

In step S241, the searching module 130 further determines whether the first file format conforms to the specification of the mobile device issuing the above request.

In step S242, when the first file format conforms to the specification of the mobile device issuing the above request, the transmission module 140 sends the file in the first file format to the mobile device issuing the above request. In other words, in this situation, the specification of the mobile device issuing the above download request is only related to the specification common to most of the mobile devices registered in the file management device 100.

In step S243, when the first file format does not conform to the specification of the mobile device issuing the above download request, the searching module 130 downloads the file in a second file format from the Internet. The second file format conforms to the specification common to the second largest number of mobile devices.

In step S244, the searching module 130 further determines whether the second file format conforms to the specification of the mobile device issuing the above download request.

In step S245, when the second file format conforms to the specification of the mobile device issuing the download request, the transmission module 140 sends the file in the second file format to the mobile device issuing the request.

In step S246, when the second file format does not conform to the specification of the mobile device issuing the request, the second file format is replaced and then the process returns to step S243 to download the file in a new second file format.

In other words, when the specification of the mobile device issuing the request does not belong to the specification common to the largest number of mobile devices registered in the file management device 100, the searching module 130 searches for another file format (e.g. the second file format and the updated second file format) file, as shown in the above steps S243, S244 and S246, until the file format of the downloaded file conforms to the specification of the mobile device issuing the request, as shown in step S245.

For example, AVI, MP4, RM and RMVB movie files of The Bourne Identity 4 are found on the Internet, and the searching module 130 determines that five of the mobile devices of a family support the AVI format, four devices support the MP4 format, the rest three devices support the RMVB format, and other formats are unsupported. In this case, the movie file downloaded by the searching module 130 at the first time may conform to the AVI format (i.e. the first file format). If the mobile device issuing the download request does not support the AVI format, the searching module 130 may download the MP4 (i.e. the second file format) file at the second time. If the mobile device issuing the request still does not support the MP4 format, the searching module 130 may download the RMVB (i.e. the updated second file format) file at the third time.

As described above, in this embodiment, the searching module 130 may at the first time download a file in the format supported by the largest number of mobile devices, at the second time download a file in the format supported by the second largest number of mobile devices, at the third time download a file in the format supported by the third largest number of mobile devices, and so on. The file in the file format supported by the specification common to the larger number of mobile devices may be downloaded at a higher priority.

In an embodiment, in step S242 or step S245, the transmission module 140 further provides all the mobile devices with a download interface to show a list of downloaded files. This list may solely show files in the file formats supported by the mobile devices logging in the download interface. Also, the transmission module 140 sends the logged-in mobile device a file indicated by a download confirmation command after receiving the download confirmation command from the logged-in mobile device.

In another embodiment, the management data includes a record of authority attributed to each of the mobile devices. In the above step S242, the management module 120 may further determine whether the authority attributed to the mobile device issuing the download request conforms to the content of the file. When the authority attributed to the device issuing the request conforms to the content of the file, the transmission module 140 sends the file in the first file format to the mobile device issuing the request. Otherwise, when the authority attributed to the device issuing the request does not conform to the content of the file, the transmission module 140 does not send the file in the first file format to the device issuing the request.

For example, if a kid less than 18 years old in the family sends a download request for the movie file "The Bourne Identity 4", the transmission module 140 forbids sending this file (in the first file format) to the mobile device issuing the request, in response to the restriction imposed by the management module 120 since the movie is rated as the restricted rating prohibited for those under 18.

Likewise, in another embodiment, in step S245, the management module 120 may further determine whether the authority attributed to the mobile device issuing the download request conforms to the content of the file. When the authority attributed to the device issuing the request conforms to the content of the file, the transmission module 140 sends the file in the second file format to the device issuing the request. Otherwise, when the authority attributed to the mobile device issuing the download request does not conform to the content of the file, the transmission module 140 does not send the file in the second file format to the device issuing the request.

In an embodiment, the above file management method is performed by executing a program stored in a computer-readable media.

Figure 4:
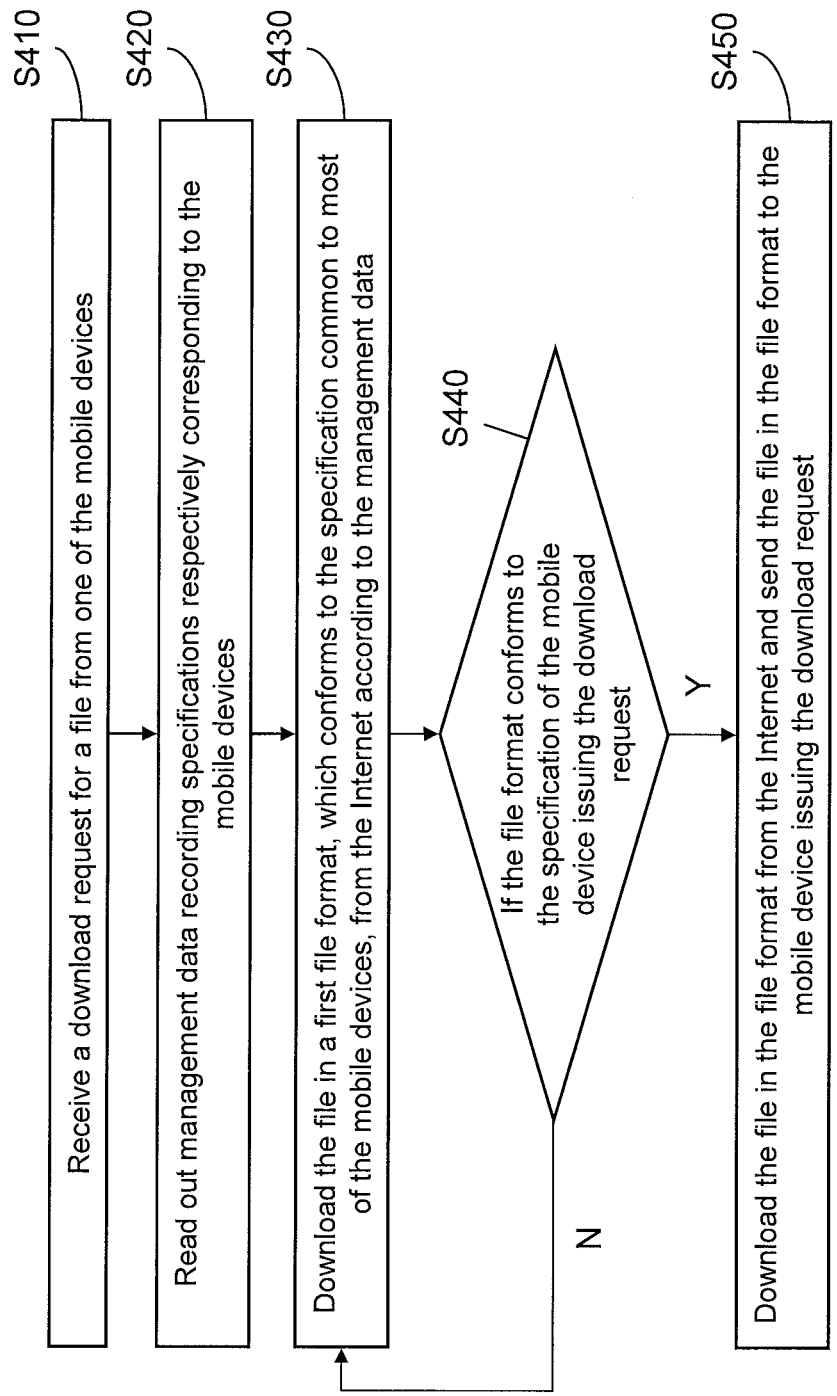
FIG. 4 is a flow chart of a file management method applied to the television equipment in yet another embodiment.

FIG. 4 is a flow chart of a file management method applied to the television equipment in yet another embodiment. As shown in FIG. 4, the file management method applied to television equipment includes steps S410~S450.

In step S410, the communication module 110 receives a download request for a file from one of the mobile devices.

In step S420, the management module 120 reads the management data which records specifications respectively corresponding to the mobile devices.

In step S430, the searching module 130, according to the management data, searches for the file in a file format from the Internet, and the file format conforms to the specification common to the largest number of mobile devices.

In step S440, the searching module 130 determines whether the file format of a found file conforms to the specification of the mobile device issuing the download request. When the searching module 130 determines that the file format of the found file conforms to the specification of the device issuing the request, the process returns to step S430 to search for a file in another file format.

In step S450, when the searching module 130 determines that the file format of the found file conforms to the specification of the mobile device issuing the download request, the searching module 130 downloads this file in the file format from the Internet, and the transmission module 140 sends this file in the file format to the device issuing the request.

Specifically, as compared to the embodiment with respect to FIG. 3, in the file management method in this embodiment, the searching module 130 determines whether a file format conforms to the specification of the mobile device issuing the download request before downloading a file in this file format from the Internet (after getting a search result). Therefore, the downloaded file may more greatly fit for the user's requirement, so as to avoid wasting network resources and time. The details of other relevant steps have been described above and thus, will not be repeated hereinafter.

To sum up, the disclosure may download a file in a first file format from the Internet according to the specifications of the mobile devices after receiving a download request, so that the first file format conforms to the specification common to the largest number of mobile devices. Alternatively, the disclosure may download a file in a second file format from the internet, so the second file format conforms to the specification common to the second largest number of mobile devices, or further conforms to the specification of the mobile device issuing the download request. In addition, before downloading a file from the Internet, the disclosure may also determine whether the file format of the file conforms to the specification common to the largest number of mobile devices and conforms to the specification of the mobile device issuing the download request. When the file format fits in one of the above conditions, the file in the file format then may be downloaded. Therefore, convenience of the television equipment is enhanced, and user experience in connection with interactivity functions and applications between the television equipment and mobile devices is greatly improved as well.

What is claimed is:

1. A file management method applied to a television equipment capable of connecting multiple mobile devices, and wherein the television equipment including a communication module, a management module, and a searching module, the file management method comprising steps of:
   receiving a download request for a file from one of the mobile devices via the communication module;
   reading out management data which records a plurality of specifications respectively corresponding to the mobile devices via the management module; and
   downloading the file in a first file format from Internet according to the management data via the searching module, and the first file format conforming to the specification common to the largest number of mobile devices;
   wherein after the file in the first file format is downloaded from the internet, the file management method further comprises steps of:
   determining whether the first file format conforms to the specification of the mobile device issuing the download request;
   sending the file in the first file format to the mobile device issuing the download request when the first file format conforms to the specification of the mobile device issuing the download request: and
   downloading the file in a second file format from the internet when the first file format does not conform to the specification of the mobile device issuing the download request, and the second file format conforming to the specification common to the second largest number of mobile devices.

2. The file management method according to claim 1, wherein after the file in the second file format is downloaded from the internet, the file management method further comprises steps of:
   determining whether the second file format conforms to the specification of the mobile device issuing the download request;
   updating the second file format and downloading the file in the updated second file format when the second file format does not conform to the specification of the mobile device issuing the download request, and repeating the above steps until the second file format conforms to the specification of the mobile device issuing the download request; and
   sending the file in the second file format to the mobile device issuing the download request when the second file format conforms to the specification of the mobile device issuing the download request.

3. The file management method according to claim 2, wherein the management data records authority attributed to each of the mobile devices; and
   before the file in the first or second file format is sent to the mobile device issuing the download request in response to whether the first or second file format conforms to the specification of the mobile device issuing the download request, the file management method further comprises steps of:
   determining whether the authority attributed to the mobile device issuing the download request conforms to a content of the file; and
   when the authority attributed to the mobile device issuing the download request conforms to the content of the file, sending the file in the first or second file format to the mobile device issuing the download request.

4. The file management method according to claim 1, wherein the management data is established through a registration procedure related to the mobile devices, and the registration procedure comprises:
   receiving model information of each of the mobile devices;
   acquiring the specification of the mobile device corresponding to the model information of each of the mobile devices; and
   recording the specifications in the management data.

5. A non-transitory computer-readable media which stores a program that is executable to perform the file management method of claim 1.

6. A television equipment capable of connecting multiple mobile devices, comprising:
   a communication module for receiving a download request for a file from one of the mobile devices;
   a management module coupled to the communication module, for reading out management data recording a plurality of specifications respectively corresponding to the mobile devices; and
   a searching module coupled to the communication module and the management module, for downloading the file in a first file format from Internet according to the management data, and the first file format conforming to the specification common to the largest number of mobile devices;
   wherein the management data records authority attributed to each of the mobile devices and the management module further determines whether the authority attributed to the mobile device issuing the download request conforms to a content of the file before the file in the first file format is sent to the mobile device issuing the download request; and
   when the authority attributed to the mobile device issuing the download request conforms to the content of the file, the transmission module sends the file in the first format to the mobile device issuing the download request.

7. The television equipment according to claim 6, further comprising:
   a transmission module coupled to the searching module, wherein the searching module determines whether the first file format conforms to the specification of the mobile device issuing the download request;
   when the first file format conforms to the specification of the mobile device issuing the download request, the transmission module sends the file in the first file format to the mobile device issuing the download request;
   when the first file format does not conform to the specification of the mobile device issuing the download request, the searching module further downloads the file in a second file format from the Internet, and the second file format conforming to the specification common to the second largest number of mobile devices.

8. The television equipment according to claim 7, wherein the searching module further determines whether the second file format conforms to the specification of the mobile device issuing the download request;
   when the second file format does not conform to the specification of the mobile device issuing the download request, the searching module updates the second file format, downloads the file in the updated second file format and repeats the foregoing steps until the second file format conforms to the specification of the mobile device issuing the download request; and
   when the second file format conforms to the specification of the mobile device issuing the download request, the transmission module sends the file in the second file format to the mobile device issuing the download request.

9. The television equipment according to claim 8, wherein when the authority attributed to the mobile device issuing the download request conforms to the content of the file, the transmission module further sends the file in the first or second file format to the mobile device issuing the download request.

10. The television equipment according to claim 6, wherein the management data is established through a registration procedure related to the mobile devices; and
   in the registration procedure, the management module receives model information of each of the mobile devices, acquires the specification of the mobile device corresponding to the model information of each of the mobile devices, and records the specifications in the management data.

11. A file management method applied to television equipment capable of connecting multiple mobile devices, and wherein the television equipment including a communication module, a management module, and a searching module, and the file management method comprising steps of:
   receiving a download request for a file from one of a plurality of the mobile devices via the communication module;
   reading out management data which records a plurality of specifications respectively corresponding to the mobile devices via the management module;
   downloading the file in a file format from Internet according to the management data via the searching module, and the file format conforming to the specification common to most of the mobile devices;
   determining whether the file format conforms to the specification of the mobile device issuing the download request; and
   updating the file format and downloading the file in the updated file format when the file format does not conform to the specification of the mobile device issuing the download request and repeating the above steps until the file format conforms to the specification of the mobile device issuing the download request.

12. The file management method according to claim 11, wherein determining whether the file format conforms to the specification of the mobile device issuing the download request is before the step of downloading the file in the file format from the Internet is performed, and
   when the file format conforms to the specification of the mobile device issuing the download request, performing the step of downloading the file in the file format, and sending the file in the file format to the mobile device issuing the download request.

* * * * *